(12) United States Patent
Lee

(10) Patent No.: US 9,135,648 B2
(45) Date of Patent: Sep. 15, 2015

(54) METHOD, TERMINAL, SERVER, AND SYSTEM FOR PROVIDING A SERVICE

(75) Inventor: Sang-Bum Lee, Goyang-si (KR)

(73) Assignee: KT Corporation, Seongnam (KR)

( * ) Notice: Subject to any disclaimer, the term of this patent is extended or adjusted under 35 U.S.C. 154(b) by 566 days.

(21) Appl. No.: 13/530,980

(22) Filed: Jun. 22, 2012

(65) Prior Publication Data

US 2012/0326848 A1    Dec. 27, 2012

(30) Foreign Application Priority Data

Jun. 24, 2011  (KR) .......................... 10-2011-0061907

(51) Int. Cl.
| | | |
|---|---|---|
| *G06Q 30/06* | (2012.01) | |
| *H04L 29/08* | (2006.01) | |
| *H04W 4/18* | (2009.01) | |
| *G06Q 30/02* | (2012.01) | |

(52) U.S. Cl.
CPC ................ *G06Q 30/06* (2013.01); *G06Q 30/02* (2013.01); *H04L 67/16* (2013.01); *H04L 67/32* (2013.01); *H04W 4/18* (2013.01)

(58) Field of Classification Search
CPC ........ G06Q 30/02–30/06; H04L 67/16–67/42; H04W 4/02–4/18; H04H 60/74
USPC ......... 340/10.1–10.52, 572.1–572.9; 235/375
See application file for complete search history.

(56) References Cited

U.S. PATENT DOCUMENTS

| | | | |
|---|---|---|---|
| 6,351,643 B1 * | 2/2002 | Haartsen ....................... 455/450 |
| 6,865,171 B1 * | 3/2005 | Nilsson ......................... 370/338 |
| 6,950,938 B1 * | 9/2005 | Fujiwara ....................... 713/182 |
| 7,463,151 B1 * | 12/2008 | Schulte-Kellinghaus . 340/572.1 |
| 7,739,407 B1 * | 6/2010 | Pakkala ........................ 709/246 |
| 2003/0191798 A1 * | 10/2003 | Shimizu et al. ............... 709/202 |
| 2004/0156487 A1 * | 8/2004 | Ushiki et al. ............... 379/88.22 |
| 2004/0238635 A1 * | 12/2004 | Ozaki et al. .................. 235/451 |
| 2005/0010573 A1 * | 1/2005 | Garg .............................. 707/10 |
| 2005/0093986 A1 * | 5/2005 | Shinohara et al. ......... 348/208.1 |
| 2005/0228853 A1 * | 10/2005 | Yamamura et al. ........... 709/200 |
| 2005/0250458 A1 * | 11/2005 | Graham et al. ............... 455/121 |
| 2006/0062363 A1 * | 3/2006 | Albrett ..................... 379/101.01 |
| 2006/0195239 A1 * | 8/2006 | Teichner et al. ................ 701/36 |
| 2006/0221932 A1 * | 10/2006 | Iwatsu et al. .................. 370/352 |
| 2006/0293964 A1 * | 12/2006 | Akihata .......................... 705/26 |
| 2007/0006272 A1 * | 1/2007 | Kikkoji et al. ................ 725/100 |

(Continued)

FOREIGN PATENT DOCUMENTS

| | | |
|---|---|---|
| KR | 10-2007-0097627 A | 10/2007 |
| KR | 10-2008-0104398 A | 12/2008 |

OTHER PUBLICATIONS

Korean Office Action dated Sep. 11, 2013, issued in Korean Patent Application No. 10-2011-0061907.

*Primary Examiner* — Hai Phan
*Assistant Examiner* — Orlando Bousono
(74) *Attorney, Agent, or Firm* — Sughrue Mion, PLLC

(57) ABSTRACT

A method, terminal, server, and a system for providing a service are provided. In a method of providing a plurality of applications pursuant to identifying a tag by a user terminal, the user terminal identifies the tag to obtain tag information and transmits a request for a service to a service providing server, which then obtains a plurality of application identification information corresponding to the tag information and generates and provides to the user terminal an applications list corresponding to the plurality of application identification information.

9 Claims, 4 Drawing Sheets

(56) References Cited

U.S. PATENT DOCUMENTS

| | | | |
|---|---|---|---|
| 2007/0013488 A1* | 1/2007 | Hayashi | 340/10.51 |
| 2007/0074024 A1* | 3/2007 | Cheong et al. | 713/171 |
| 2007/0080784 A1* | 4/2007 | Kim et al. | 340/10.1 |
| 2007/0110010 A1* | 5/2007 | Kotola et al. | 370/338 |
| 2007/0120547 A1* | 5/2007 | Tateishi et al. | 323/282 |
| 2007/0125837 A1* | 6/2007 | Park et al. | 235/375 |
| 2007/0143364 A1* | 6/2007 | Chen et al. | 707/203 |
| 2007/0206510 A1* | 9/2007 | Morris et al. | 370/252 |
| 2008/0004985 A1* | 1/2008 | Kang | 705/26 |
| 2008/0187188 A1* | 8/2008 | Beletski et al. | 382/124 |
| 2008/0219427 A1* | 9/2008 | Naono et al. | 379/218.01 |
| 2008/0263175 A1* | 10/2008 | Naono et al. | 709/217 |
| 2008/0320105 A1* | 12/2008 | Naono et al. | 709/219 |
| 2009/0070379 A1* | 3/2009 | Rappaport | 707/104.1 |
| 2009/0098885 A1* | 4/2009 | Gogic et al. | 455/456.1 |
| 2009/0143067 A1* | 6/2009 | Kim et al. | 455/434 |
| 2009/0243814 A1* | 10/2009 | Yamamoto | 340/10.52 |
| 2009/0302998 A1* | 12/2009 | Trappeniers et al. | 340/5.61 |
| 2010/0023510 A1* | 1/2010 | Naono et al. | 707/5 |
| 2010/0085154 A1* | 4/2010 | Park et al. | 340/5.85 |
| 2010/0156609 A1* | 6/2010 | Kim et al. | 340/10.5 |
| 2011/0187745 A1* | 8/2011 | Kang et al. | 345/633 |
| 2011/0241882 A1* | 10/2011 | Gonzales et al. | 340/572.1 |
| 2011/0248826 A1* | 10/2011 | Criel et al. | 340/10.1 |
| 2011/0258443 A1* | 10/2011 | Barry | 713/168 |
| 2011/0314153 A1* | 12/2011 | Bathiche et al. | 709/225 |
| 2012/0023159 A1* | 1/2012 | Takamura | 709/203 |

* cited by examiner

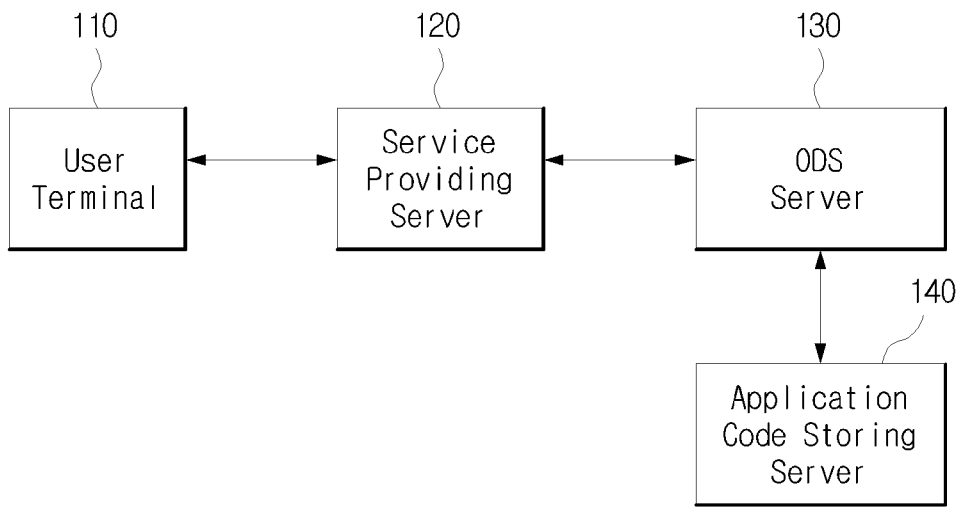
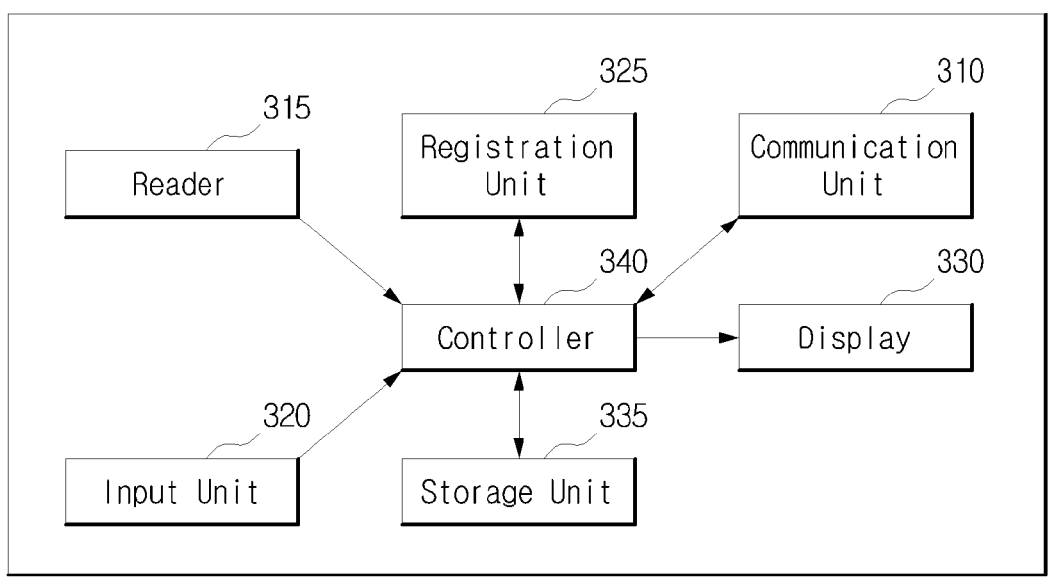

METHOD, TERMINAL, SERVER, AND SYSTEM FOR PROVIDING A SERVICE

CROSS-REFERENCE TO RELATED APPLICATIONS

This application claims priority from Korean Patent Application No. 10-2011-0061907, filed with the Korean Intellectual Property Office on Jun. 24, 2011, the disclosure of which is incorporated herein by reference in its entirety.

BACKGROUND

1. Technical Field

Exemplary embodiments relate to a method, terminal, server, and a system for providing a plurality of related applications to a user pursuant to identifying one tag.

2. Background Art

With the rapid progress of the telecommunication technologies, there have been efforts to develop so-called ubiquitous environments, in which telecommunication devices can be applied to real life in a natural, convenient way without being restricted by time and space. Indispensable to building these ubiquitous environments is the wireless identification technology, representative of which includes Radio Frequency Identification (RFID) and Near Field Communication (NFC), in which telecommunication devices can detect and identify one another remotely and effectively.

The wireless identification technology, which is an area of the automatic identification technology, such as barcodes, magnetic sensors, IC cards, etc., uses ultra-short waves or long waves to wirelessly identify data stored in a microchip, thereby allowing a reader to identify a tag attached to an object.

The conventional wireless identification technology simply displays tag information stored in the tag or provides a service by accessing an Object Directory Service (ODS) server based on the tag information to connect to an Object Information Service (OIS) server, in which real information is located. In this kind of conventional wireless identification technology, a single tag has one connection address only.

SUMMARY

Exemplary embodiments provide a method and a system that can provide a plurality of related application to a user terminal pursuant to identifying a single tag.

Exemplary embodiments also provide a plurality of applications based on user preference to a user terminal.

An aspect of an exemplary embodiment features a system that provides a plurality of applications to a user terminal pursuant to identifying a tag of the user terminal.

A system for providing a service in accordance with an exemplary embodiment can include: an application code storing server configured to map at least one from among service category and application identification information in tag information and to store the at least one from among service category and application identification information; an object directory service (ODS) server configured to obtain a plurality of application identification information corresponding to the tag information from the application code storing server pursuant to a service provision request of a user terminal that includes the tag information; and a service providing server configured to generate an applications list including the plurality of obtained application identification information and transmit the applications list to the user terminal. The plurality of application identification information may all be of a same service category.

Another aspect of an exemplary embodiment features a method for providing a plurality of applications to a user terminal pursuant to identifying a tag of the user terminal.

A method of providing a plurality of applications pursuant to identifying a tag by a user terminal in accordance with an exemplary embodiment can include: obtaining tag information by identifying a tag; receiving a service provision request including the tag information from the user terminal, the service provision request being received by a service providing server; obtaining a plurality of application identification information corresponding to the tag information pursuant to the service provision request, the plurality of application identification information being obtained by the service providing server; and generating an applications list including the plurality of application identification information and providing the applications list to the user terminal, the applications list being generated and provided by the service providing server. The tag may be identified by the user terminal.

Yet another aspect of an exemplary embodiment is directed to a user terminal for receiving a service. The user terminal includes: a communication unit configured to transmit a service provision request including tag information, to a service providing server, a reader which reads a tag, a registration unit configured to register at least one from among a service category to be linked with the tag and the application identification information, in a database, and a controller configured to control the transmission of the service provision request which includes the tag information to be sent to the service providing server, and to obtain a corresponding applications list from the service providing server.

The service provision request may further include user terminal information, wherein the service providing server is configured to store a selection frequency pursuant to the application identification information in a database, and wherein the applications list is generated by arranging extracted application identification information pursuant to the terminal information in an order of selection frequency.

The registration unit may receive and register at least one from among the tag information, the service category for a service to be linked with the corresponding tag and at least one of the application identification information.

Yet another exemplary embodiment is directed to a service providing server. The server includes: a communication unit which receives a service provision request including tag information from a user terminal, and outputs the service provision request to an extraction unit; the extraction unit which extracts at least one of the application identification information corresponding to the tag information included in the service provision request, and outputs the application identification information to a service providing unit, and the service providing unit which generates an applications list, and provides the applications list to a user terminal.

The service provision request may further include user terminal information, wherein the service providing server stores a selection frequency pursuant to the application identification information in a database, and wherein the applications list is generated by arranging the extracted application identification information pursuant to the user terminal information in an order of selection frequency.

BRIEF DESCRIPTION OF THE DRAWINGS

FIG. 1 is a block diagram briefly illustrating a configuration of a system for providing a service that can provide a plurality of related applications to a user terminal pursuant to identifying a single tag.

FIG. 2 shows an exemplary code form in which application identification information is stored in an information storing server in accordance with a tag.

FIG. 3 is a block diagram briefly illustrating an internal configuration of a user terminal.

DETAILED DESCRIPTION

Figure 4:
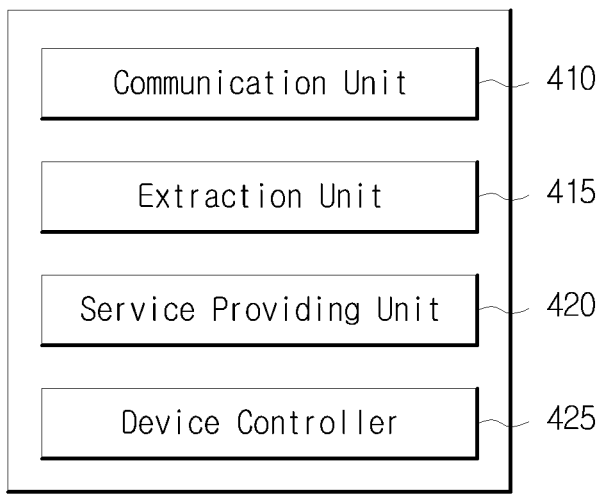
FIG. 4 is a block diagram briefly illustrating an internal configuration of an apparatus for providing a service.

Since there can be a variety of permutations and exemplary embodiments, certain exemplary embodiments will be illustrated and described with reference to the accompanying drawings. This, however, is by no means to restrict the inventive concept to certain exemplary embodiments, and shall be construed as including all permutations, equivalents and substitutes covered by the ideas and scope of the inventive concept. Throughout the description, when describing a certain technology is determined to evade the point of an exemplary embodiment, the pertinent detailed description will be omitted.

Terms such as "first" and "second" can be used in describing various elements, but the above elements shall not be restricted to the above terms. The above terms are used only to distinguish one element from the other.

The terms used in the description are intended to describe certain exemplary embodiments only, and shall by no means restrict the exemplary embodiments. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, certain exemplary embodiments will be described with reference to the accompanying drawings.

FIG. 1 is a block diagram briefly illustrating a configuration of a system for providing a service that can provide a plurality of related applications to a user terminal pursuant to identifying a single tag, and FIG. 2 shows an exemplary code form in which application identification information is stored in an information storing server in accordance with a tag.

Referring to FIG. 1, the system for providing a service includes a user terminal 110, a service providing server 120, an ODS server 130 and an application code storing server 140.

The user terminal 110 is a device that can be provided with a plurality of applications corresponding to tag information from the service providing server 120 after the tag information is obtained by reading an electronic tag.

In the present description, the tag can be an electronic tag, such as an RFID tag and an NFC tag. It shall be also appreciated that the tag can be a two-dimensional or three-dimensional barcode or a QR code, depending on how it is embodied.

For the convenience of description and understanding, it will be assumed in the present description that the tag is an electronic tag.

Moreover, the tag information can include tag identification information for identifying the pertinent tag, and the tag identification information can be at least one of numbers, letters and special characters or a combination thereof.

Some examples of the user terminal 110 include a mobile communication terminal, a smart phone, a personal digital assistant (PDA), etc. In addition, any device that can encompass a reader and read an electronic tag or any device that can attach a reader can be equivalently used as the user terminal 110.

Upon receiving a service provision request including the tag information from the user terminal, the service providing server 120 obtains a plurality of application identification information corresponding to the tag information from the ODS server 130 and provides an applications list corresponding to the application identification information to the user terminal 110.

For example, the service providing server 120 can transmit the tag information to the ODS server 130 pursuant to the service provision request of the user terminal 110 and obtain a plurality of application identification information related to the tag information through the ODS server 130. This will become more apparent through the below description.

Moreover, the service providing server 120 can generate the applications list by arranging the plurality of application identification information obtained through the ODS server 130 in the order of preference based on terminal information or user information and transmit the applications list to the user terminal 110.

Specifically, once selection information for any one of the applications included in the applications list is received from the user terminal 110 after transmitting the applications list to the user terminal 110, the service providing server 120 can update a selection frequency in the application identification information according to the selection information and store the updated selection frequency in the database.

Accordingly, when the service provision request is later received from the user terminal 110 pursuant to identification of the same tag, the applications list can be generated by arranging the plurality of application identification information obtained through the ODS server 130 in the order of the selection frequency and can be provided to the user terminal 110. Accordingly, the user terminal 110 can preferentially display application(s) selected more frequently by a user.

Moreover, if the application identification information obtained by the service providing server 120 through the ODS server 130 is above a reference value, the service providing server 120 can generate an applications list corresponding to the application identification information in the quantity of M (a natural number) in the order of the frequency selected by the user and transmit the applications list to the user terminal 110. In such a case, the user may be provided with the applications in the quantity of M, which are frequently selected by the user, through the user terminal 110.

In another example, if the quantity of application identification information obtained from the application code storing server 140 through the ODS server 130 exceeds the quantity of output on a display screen of the user terminal 110, the service providing server 120 can use the quantity of selections or user preference to generate an applications list in the quantity of output and provide the applications list to the user terminal 110.

The ODS server 130 maps and stores access information of a server that stores the tag information and a service pursuant to the tag information.

For example, the ODS server 130 can map and perform an operation to store access information to the application code storing server 140, which stores the tag information and an application code according to the tag information. Accordingly, once the tag information is received from the service providing server 120, the ODS server 130 can extract the access information of the application code storing server 140 pursuant to the tag information from the database, use the access information to access the application code storing server 140, obtain all of the application identification information of which service category is the same corresponding to the tag information, and provide the obtained application identification information to the service providing server 120.

Of course, it is possible that the ODS server 130 transmits the access information related to the application code storing server 140 and corresponding to the tag information, to the service providing server 120, depending on the way it is embodied. Accordingly, it is also possible that a plurality of application identification information of which a service category is identical, which correspond to the tag information, is obtained after the service providing server 120 directly accesses the application code storing server 140 by using the access information.

The application code storing server 140 stores at least one of the application identification information corresponding to the tag information.

For example, the application code storing server 140 can further map and store the service category for distinguishing a particular service according to the tag information. Moreover, the application code storing server 140 can map and store one or more application identification information for each service category. The service category is identification information for identifying a particular service and can be assigned differently per service. It is illustrated in FIG. 2 that the application identification information is stored in the application code storing server 140 to correspond to at least one of the service category and the tag information.

FIG. 3 is a block diagram briefly illustrating an internal configuration of a user terminal.

Referring to FIG. 3, the user terminal 110 is constituted with a communication unit 310, a reader 315, an input unit 320, a registration unit 325, a display 330, a storage unit 335 and a controller 340.

The communication unit 310 is a means for communicating data with other devices (e.g., the service providing server 120) through a communication network.

The reader 315 is a means for reading the tag. For example, the reader 315 can read the tag and then obtain the tag information from the tag and output the tag information to the controller 340.

The input unit 320 is a means for inputting a control command for controlling the user terminal 110, a control command for controlling an application, and the like from the user. For example, the input unit 320 can be realized with a plurality of key buttons (e.g., alphanumeric keys, * or # key and one or more function keys such as the MENU key, CALL key, OK key, RUN key, etc.) or realized with the form of a touch screen.

The registration unit 325 is a means for registering at least one from among the service category to be linked with the tag and the application identification information in the database.

For example, the registration unit 325 can be inputted with, and can register in the database, at least one from among the tag information, the service category for a service to be linked with the corresponding tag and at least one of the application identification information by an administrator who manages the particular tag.

The display 330 is a means for expressing data inputted through the input unit 320, data received through the communication unit 310, data stored in the user terminal 110, and the like in the form of visual information. For example, the display 330 can be a liquid crystal display (LCD).

The storage unit 335 is a means for storing an algorithm, the registered application identification information, the application, etc. that are required for operating the user terminal 110 in accordance with an exemplary embodiment.

The controller 340 is a means for controlling internal components of the user terminal 110 in accordance with an embodiment of the present invention, namely, the communication unit 310, the reader 315, the input unit 320, the registration unit 325, the display 330 and the storage unit 335.

Moreover, once the tag information is inputted through the reader 315, the controller 340 can control the service provision request including the tag information to be sent to the service providing server 120 and then obtain the corresponding applications list from the service providing server 120 and express the applications list through the display 330. As described earlier, the applications list can include at least one individual application.

FIG. 4 is a block diagram briefly illustrating an internal configuration of an apparatus for providing a service.

Referring to FIG. 4, the service providing server 120 is comprised of a communication unit 410, an extraction unit 415, a service providing unit 420 and a device controller 425.

The communication unit 410 is a means for communicating data with other devices (e.g., the user terminal 110) through a communication network.

For example, the communication unit 410 can receive the service provision request including the tag information from the user terminal 110 and output the service provision request to the extraction unit 415.

The extraction unit 415 extracts at least one of the application identification information corresponding to the tag information included in the service provision request that is inputted through the communication unit 410 and outputs the application identification information to the service providing unit 420. Here, the extraction unit 415 can obtain the application identification information of which the service category is the same corresponding to the tag information from the application code storing server 140 through the ODS server 130.

In case the service providing server 120 has or is connected with a separate database, it is also possible for the extraction unit 415 to extract at least one of the application identification information, of which the service category is the same, corresponding to the tag information from the database. Then, the extraction unit 415 can output at least one of the service category and the obtained application identification information to the service providing unit 420.

The service providing unit 420 is a means for generating an applications list for at least one from among the service category and the application identification information that are inputted through the extraction unit 415 and providing the applications list to the user terminal 110.

Here, the service providing unit 420 can generate and provide the applications list to the user terminal 110 in such a way that the application with a higher user preference is displayed at a higher profile position.

For example, the service providing unit 420 can obtain the terminal information from the user terminal 110 and arrange the applications in such a way that the application that is most frequently selected in the applications list provided according to the terminal information is displayed at a higher profile position. For this, once any one of the applications included in the applications list provided to the user terminal 110 is selected after the applications list is provided to the user terminal 110, the service providing unit 420 can register and manage a selection frequency of the application in the database.

Afterwards, if a service provision request pursuant to the same tag information is received, the service providing unit 420 can generate the applications list by arranging the applications in such a way that the application with a greater selection frequency corresponding to the application identification information extracted through the extraction unit in accordance with the tag information, is displayed at a higher profile position and the service providing unit 420 can provide the generated applications list to the user terminal 110. Accordingly, the application that is more frequently selected by the user can be displayed at a higher profile position of the user terminal 110.

In another example, the service providing unit 420 can arrange the applications included in the applications list in the order of user preference by using the user information corresponding to the user terminal 110 pursuant to the service provision request of the user terminal 110 and provide the applications list to the user terminal 110. Accordingly, the application with a higher user preference can be displayed preferentially or at a part on the user terminal 110 reserved for preferred applications. Here, it is possible that the user information is obtained through the user terminal 110 or is pre-stored in the service providing server 120 in accordance with the terminal information. Therefore, it is possible for the service providing unit 420 to arrange the applications included in the applications list in the order of preference by using the user information and send the applications list to the user terminal 110.

The device controller 425 is a means for controlling internal components of the service providing server 120 in accordance with an exemplary embodiment, namely, the communication unit 410, the extraction unit 415, the service providing unit 420, etc.

Figure 5:
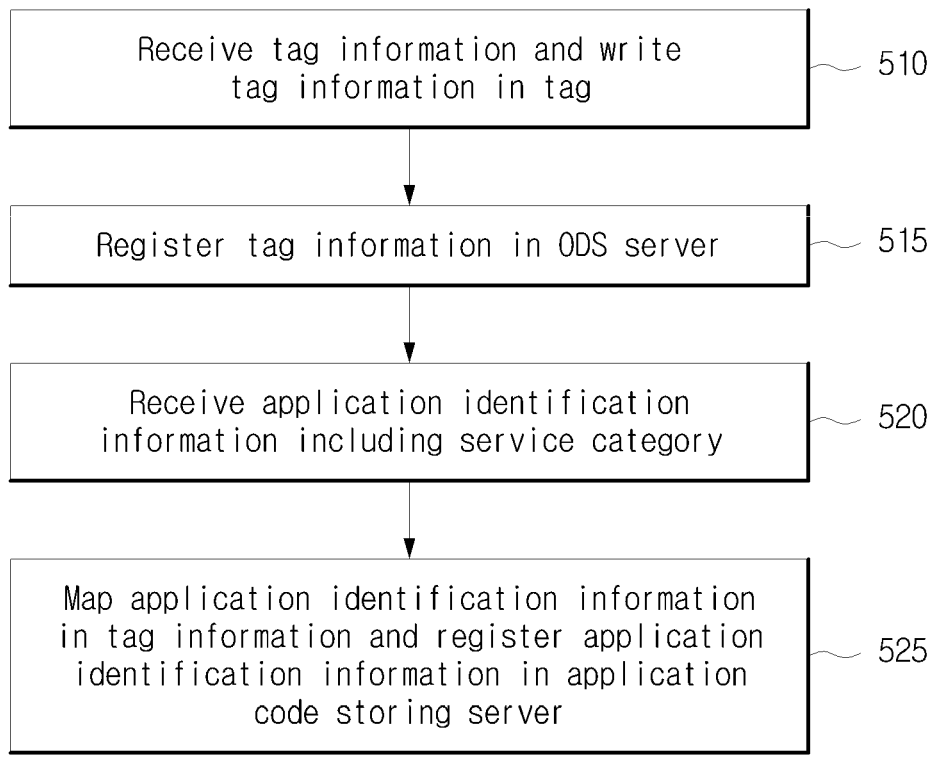
FIG. 5 is a flow diagram showing a method of registering tag information and application identification information in a database.

FIG. 5 is a flow diagram showing a method of registering tag information and application identification information in a database.

In operation 510, the user terminal 110 is inputted with tag information from the user and writes the tag information in the tag.

Then, as the tag information is written in the tag, the user terminal 110 simultaneously registers the tag information in the ODS server 130 in operation 515. Here, the user terminal 110 can also register access information to the application code storing server 140 in accordance with the tag information in the ODS server 130.

Then in operation 520, the user terminal is inputted with a plurality of application identification information corresponding to the tag from the user. Here, the application identification information corresponds to the application registered in the service providing server 120.

Then in operation 525, the user terminal 110 maps the pertinent application identification information in the tag information and registers the mapped application identification information in the application code storing server 140. Moreover, when the application identification information is inputted, the user terminal 110 can be further inputted or selected with the service category, which can be then registered in the database together with the application identification information.

Although it is described with reference to FIG. 5 that the tag information and the application identification information related to the tag information are respectively registered by the user terminal 110, the tag information and the application identification information related to the tag information can be registered by different entities.

For example, it is possible that the tag information is registered in the ODS server 130 by a communication service provider system or a card service provider system that issues the tag and that the application identification information is registered in the application code storing server 140 by a content provider system that registers applications in the service providing server 120.

Figure 6:
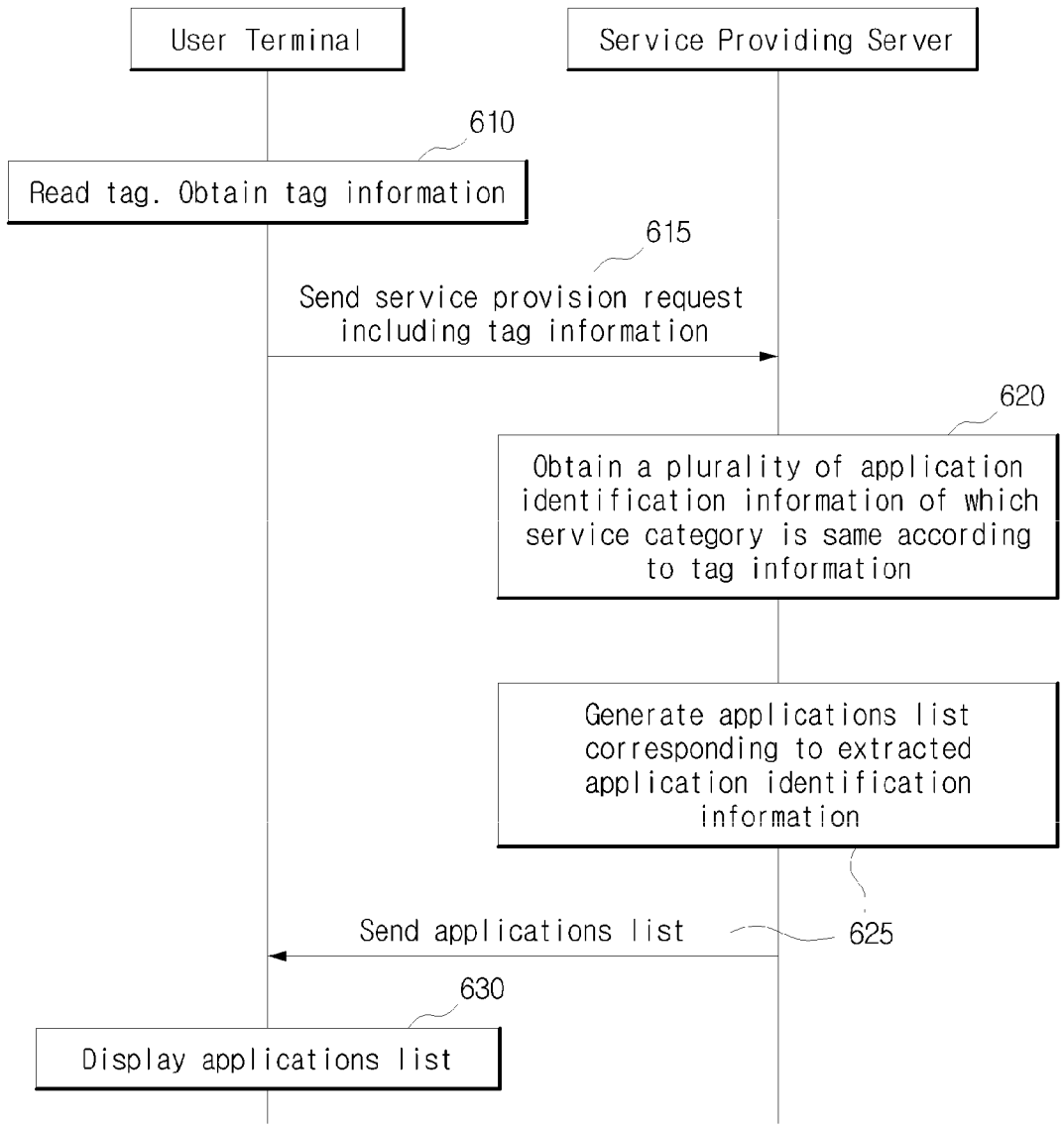
FIG. 6 is a flow diagram showing how a user terminal is provided with a plurality of applications pursuant to identifying a tag.
Figure 7:
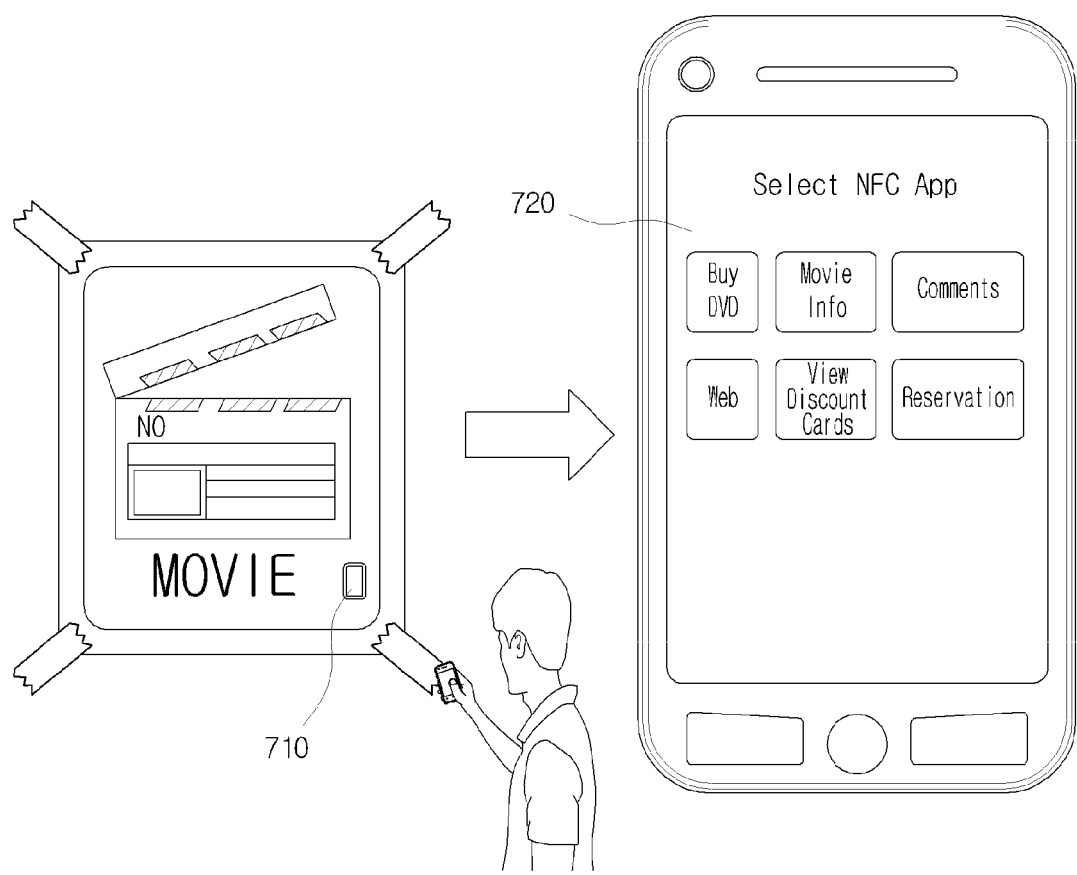
FIG. 7 illustrates a user terminal displaying an applications list on a screen.

FIG. 6 is a flow diagram showing how a user terminal is provided with a plurality of applications pursuant to identifying a tag, and FIG. 7 illustrates a user terminal displaying an applications list on a screen.

In operation 610, the user terminal 110 obtains the tag information by reading the tag.

Then in operation 615, the user terminal 110 transmits the service provision request including the obtained tag information to the service providing server 120. Here, the service provision request can further include the terminal information of the user terminal 110.

In operation 620, pursuant to the service provision request, the service providing server 120 obtains a plurality of application identification information corresponding to the tag information included in the service provision request from the application code storing server 140, through the ODS server 130.

Here, if service categories are separately mapped in the tag information, the service providing server 120 can obtain all of the application identification information of which the service category is the same according to the tag information.

Then in operation 625, the service providing server 120 generates the applications list including the applications corresponding to the extracted application identification information and provides the generated applications list to the user terminal 110.

Here, as described earlier, the service providing server 120 can generate the applications list in such a way that the application with a greater selection frequency or higher preference is displayed at a higher profile position in accordance with the user information or the terminal information of the user terminal 110 and provide the applications list to the user terminal 110. Here, the user information can be any one of gender, age and location. The location can be obtained through the user terminal or through a separate global positioning system (not shown) of a mobile communication system.

In another example, the service providing server 120 can check resolution information of the user terminal according to the terminal information and then, if the quantity of extracted application identification information exceeds the quantity of output based on the resolution information, can generate the applications list by selecting the application identification information among the extracted application identification information that are less than the quantity of output in the order of selection frequency.

In operation 630, the user terminal 110 displays the applications list obtained through the service providing server 120.

Illustrated in FIG. 7 is the applications list displayed on a screen through the user terminal 110. As illustrated in FIG. 7, the applications list that includes a plurality of applications related to a service corresponding to the tag recognized by the user terminal 110 can be provided by the service providing server 120, and then the applications list can be displayed through the screen.

Once any one of the displayed applications is selected by the user, the user terminal 110 can send the selected application identification information to the service providing server 120 and allow the selection frequency of the application to be updated corresponding to the pertinent user terminal 110.

The method of providing a plurality of applications to a user terminal pursuant to identifying a tag of a user terminal in accordance with an exemplary embodiment can be embodied in the form of program instructions, which can be performed through various electronic data processing means, and can be written in a storage medium, which can include program instructions, data files, data structures and the combination thereof.

The program instructions stored in the storage medium can be designed and configured specifically for an exemplary embodiment or can be publically known and available to those who are skilled in the field of software. Examples of the storage medium can include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions. Moreover, the above-described media can be transmission media, such as optical or metal lines and a waveguide, which include a carrier wave that transmits a signal designating program instructions, data structures, etc. Examples of the program instructions can include machine codes made by, for example, a compiler, as well as high-language codes that can be executed by an electronic data processing device, for example, a computer, by using an interpreter.

The above hardware devices can be configured to operate as one or more software modules in order to perform the operation of the present invention, and the opposite is also possible.

Although some exemplary embodiments have been described above, it shall be appreciated that there can be a variety of permutations and modifications of exemplary embodiments by those who are ordinarily skilled in the art to which the present inventive concept pertains without departing from the technical ideas and scope of the exemplary embodiments, which shall be defined by the appended claims.

What is claimed is:

1. A system for providing a service, comprising:
   an application code storing server configured to map at least one from among a service category and application identification information in tag information, and to store the at least one from among the service category and the application identification information;
   an object directory service (ODS) server configured to obtain a plurality of application identification information corresponding to the tag information from the application code storing server pursuant to a service provision request of a user terminal that includes the tag information; and
   a service providing server configured to generate an applications list including the plurality of application identification information and transmit the applications list to the user terminal,
   wherein the service provision request further comprises user terminal information,
   wherein the service providing server is configured to store a selection frequency pursuant to the plurality of application identification information in a database, the selection frequency relating to a number of times applications are selected, and
   wherein the applications list is generated by arranging extracted application identification information pursuant to the user terminal information in an order of the selection frequency.

2. The system claim 1, wherein the plurality of application identification information are all related to a same service category.

3. The system of claim 1, wherein the user terminal information is at least one from among gender, age and location.

4. The system claim 1, wherein the user terminal registers the tag information in the ODS server and registers, in the application code storing server, the at least one from among the service category and the application identification information.

5. The system claim 1, wherein one entity registers the tag information in the ODS server and another entity registers, in the application code storing server, the at least one from among the service category and the application identification information.

6. A method of providing a plurality of applications pursuant to identifying a tag by a user terminal, the method comprising:
   obtaining tag information by identifying a tag;
   receiving a service provision request including the tag information from the user terminal, the service provision request being received by a service providing server;
   obtaining a plurality of application identification information corresponding to the tag information pursuant to the service provision request, the plurality of application identification information being obtained by the service providing server; and
   generating an applications list including the plurality of application identification information and providing the applications list to the user terminal, the applications list being generated and provided by the service providing server,
   wherein the generating of the applications list comprises:
   obtaining terminal information of the user terminal;
   storing, by the service providing server, a selection frequency pursuant to the plurality of application identification information in a database, the selection frequency relating to a number of times applications are selected; and
   generating the applications list by arranging the plurality of application identification information in an order of the selection frequency corresponding to the terminal information.

7. The method of claim 6, wherein the tag is identified by the user terminal.

8. The method of claim 6, wherein the obtaining of the plurality of application identification information is performed by obtaining all of the application identification information of which a service category is the same, and which corresponds to the tag information.

9. A method of providing a plurality of applications pursuant to identifying a tag by a user terminal, the method comprising:
   obtaining tag information by identifying a tag;
   receiving a service provision request including the tag information from the user terminal, the service provision request being received by a service providing server;
   obtaining a plurality of application identification information corresponding to the tag information pursuant to the service provision request, the plurality of application identification information being obtained by the service providing server; and generating an applications list including the plurality of application identification information and providing the applications list to the user terminal, the applications list being generated and provided by the service providing server, wherein the generating of the applications list comprises:

checking resolution information of the user terminal based on the terminal information of the user terminal; and if a quantity of extracted application identification information exceeds a quantity of output based on the resolution information, generating the applications list by selecting an amount of the application identification information among the extracted application identification information that is less than the quantity of output, in an order of selection frequency, the selection frequency relating to a number of times applications are selected.

* * * * *